(12) United States Patent  
Daniel et al.

(10) Patent No.: US 8,058,840 B2
(45) Date of Patent: *Nov. 15, 2011

(54) RECHARGEABLE BATTERY ASSEMBLY WITH MOVABLE CONNECTOR AND POWER CONVERSION CIRCUITRY

(75) Inventors: Simon Richard Daniel, Surrey (GB); Christopher Verity Wright, Stroud (GB)

(73) Assignee: Moxia Energy Holdings Limited, London (GB)

( * ) Notice: Subject to any disclaimer, the term of this patent is extended or adjusted under 35 U.S.C. 154(b) by 857 days.

This patent is subject to a terminal disclaimer.

(21) Appl. No.: 11/753,381

(22) Filed: May 24, 2007

(65) Prior Publication Data

US 2007/0273327 A1 Nov. 29, 2007

Related U.S. Application Data

(60) Provisional application No. 60/803,149, filed on May 25, 2006.

(51) Int. Cl.
 *H02J 7/00* (2006.01)
(52) U.S. Cl. ............... 320/112; 320/106; 320/107
(58) Field of Classification Search .......... 320/112
 See application file for complete search history.

(56) References Cited

U.S. PATENT DOCUMENTS

| | | | |
|---|---|---|---|
| 2,876,410 A | 3/1959 | Fry | |
| 3,665,285 A | 5/1972 | Mullersman | |
| 4,086,523 A | 4/1978 | Izumi | |
| 4,622,507 A | 11/1986 | Persen | |
| 5,449,567 A | 9/1995 | Yeh | |
| 5,538,805 A | 7/1996 | Aragon | |
| 5,703,471 A * | 12/1997 | Bullock et al. | 320/134 |
| 6,077,107 A | 6/2000 | Hetherington | |
| 6,380,710 B1 | 4/2002 | Watanabe | |
| 6,456,500 B1 | 9/2002 | Chen | |
| 6,459,243 B1 * | 10/2002 | Cheiky et al. | 320/155 |
| 6,589,069 B1 | 7/2003 | Liao | |
| 6,808,400 B2 | 10/2004 | Tu | |
| 6,900,980 B2 | 5/2005 | Christopher | |
| 6,979,210 B2 | 12/2005 | Regen | |
| 7,097,472 B2 | 8/2006 | Parker | |
| 7,570,020 B1 * | 8/2009 | Kranzen et al. | 320/128 |
| 2002/0145403 A1 | 10/2002 | Wang | |
| 2003/0020627 A1 * | 1/2003 | Vukosic | 340/815.45 |
| 2003/0034757 A1 * | 2/2003 | Woodnorth | 320/132 |
| 2003/0058668 A1 * | 3/2003 | Uchida | 363/59 |

(Continued)

FOREIGN PATENT DOCUMENTS

CA 2517333 9/2002

*Primary Examiner* — Arun Williams
(74) *Attorney, Agent, or Firm* — Conley Rose, P.C.

(57) ABSTRACT

A rechargeable battery assembly comprises a built in connector, circuitry to provide charge control, at least one rechargeable battery unit, and circuitry providing a further function. The battery assembly is mechanically reversible between a deployed configuration having a general form and functions of a conventional battery format and a charge configuration in which the connector is made accessible. In the deployed configuration the battery assembly is capable of providing a discharge to at least one voltage level and can be charged by means of a suitable external charger device. In the charge configuration the battery assembly can be charged by means of the integral charge control circuitry when the connector is connected to a suitable powered receptacle on a computing or peripheral device.

41 Claims, 17 Drawing Sheets

U.S. PATENT DOCUMENTS

| | | |
|---|---|---|
| 2004/0036442 A1 | 2/2004 | Wu |
| 2004/0130289 A1 | 7/2004 | Lam |
| 2005/0012853 A1* | 1/2005 | Wang .......................... 348/376 |
| 2006/0005055 A1 | 1/2006 | Potega |
| 2006/0073717 A1 | 4/2006 | Ng |
| 2006/0255767 A1* | 11/2006 | Wong et al. .................. 320/130 |

* cited by examiner

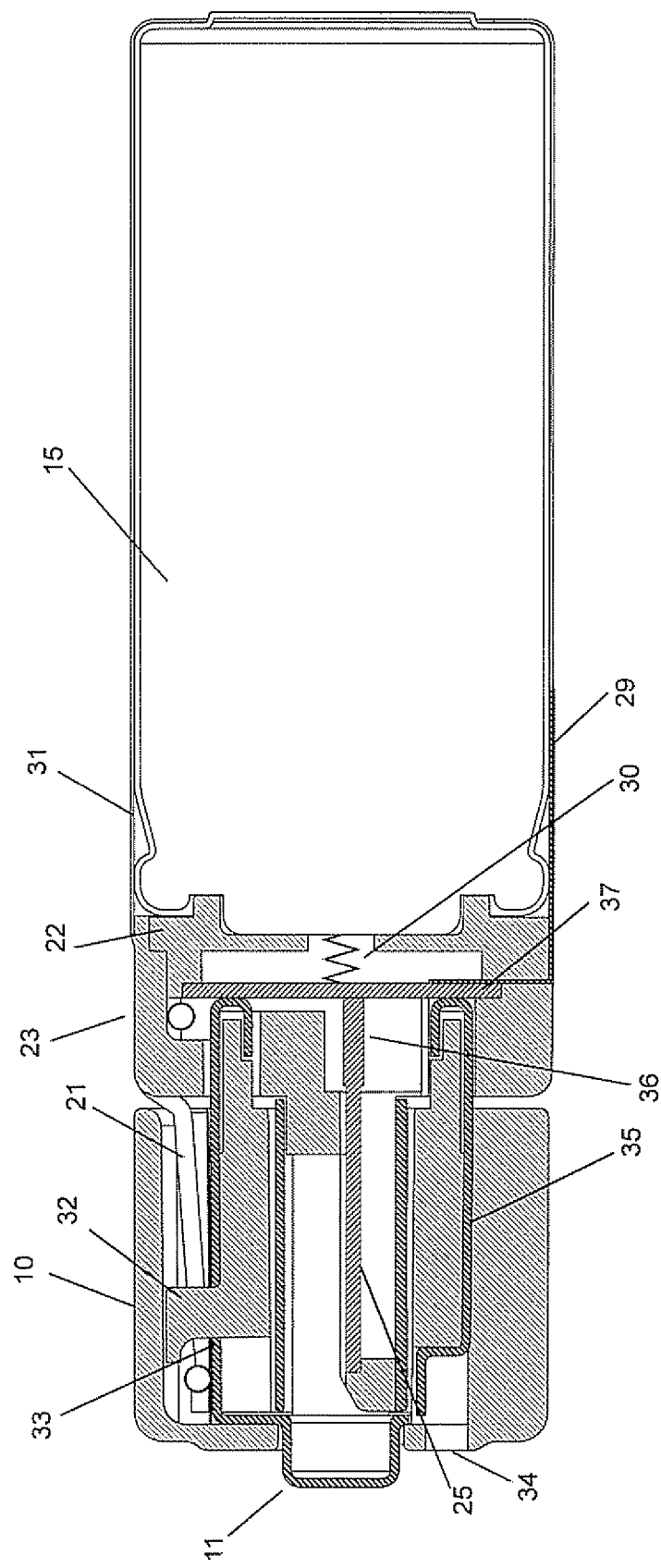

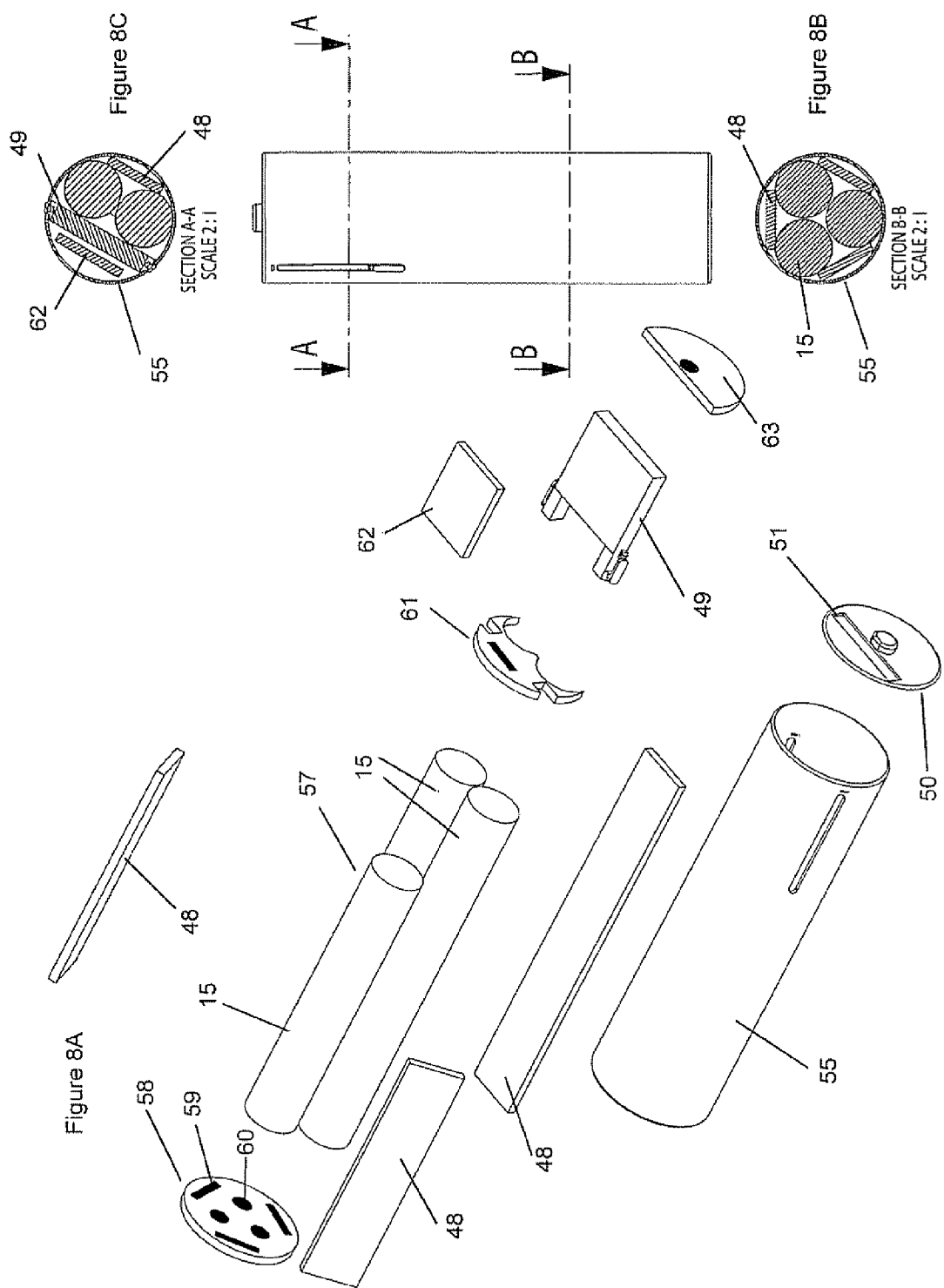

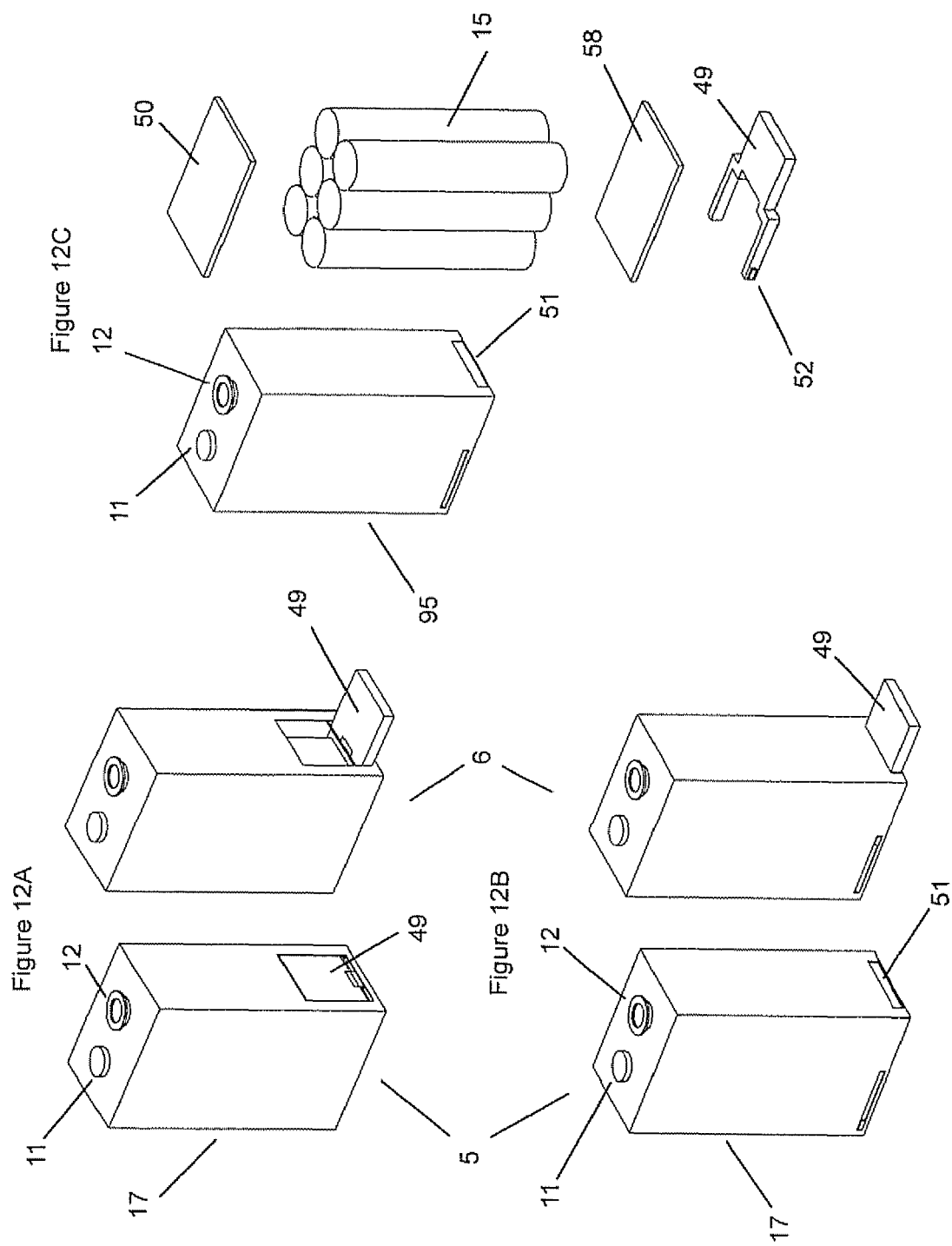

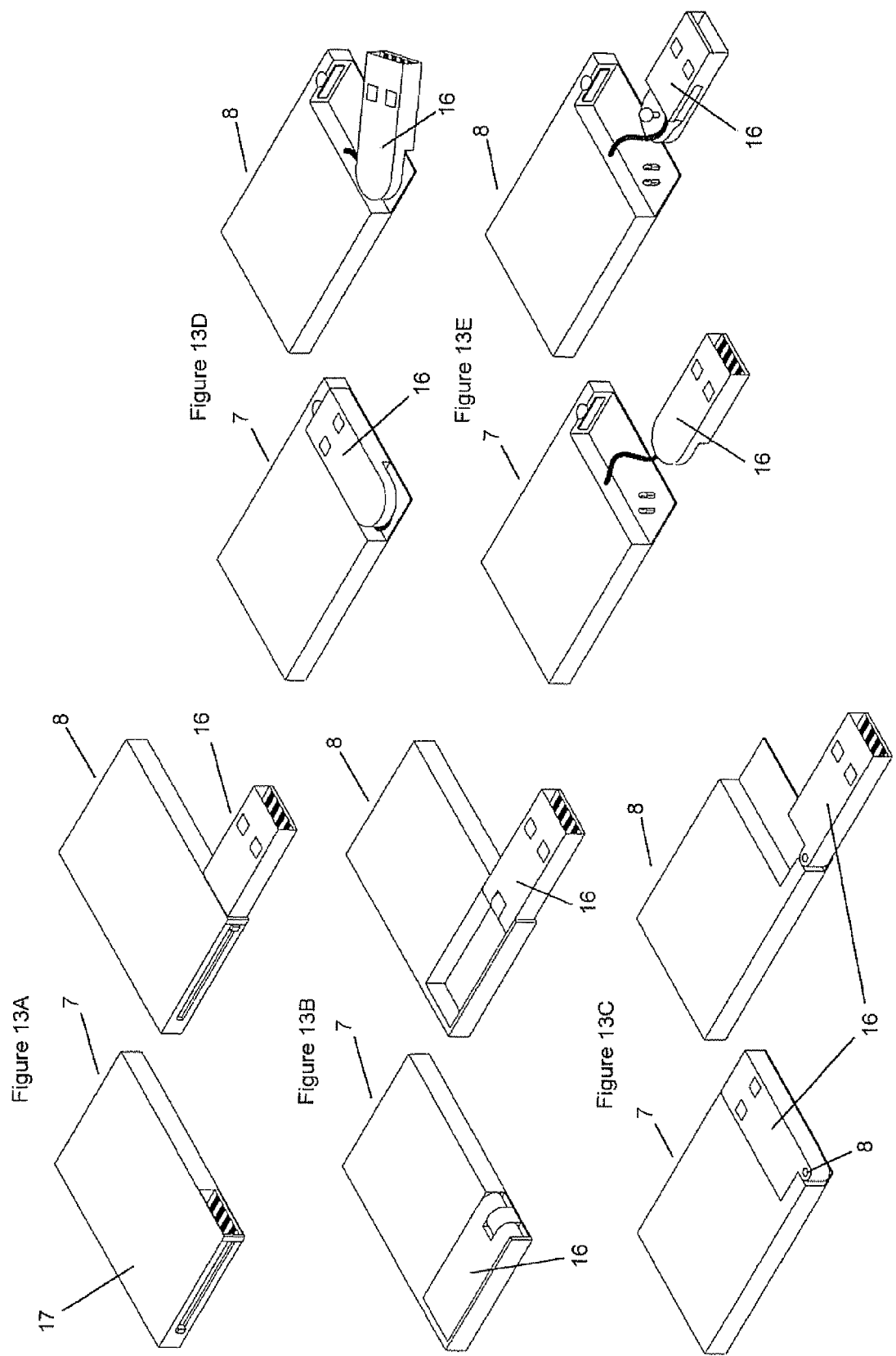

RECHARGEABLE BATTERY ASSEMBLY WITH MOVABLE CONNECTOR AND POWER CONVERSION CIRCUITRY

CROSS-REFERENCE TO RELATED APPLICATIONS

This application claims the benefit of priority to U.S. application Ser. No. 60/803,149, filed May 25, 2006, the content of which is hereby incorporated by reference herein in its entirety for all purposes.

FIELD OF THE INVENTION

The invention relates to a rechargeable battery assembly. The invention relates in preferred embodiments to mechanisms and circuitry for forming a rechargeable battery assembly that has a deployed configuration forming a regular battery format (such as a cylindrical AA, AAA, C, D type cell) or a prismatic cell (such as 9V PP3 format or a camera or "cell" phone battery), and is mechanically reversible to a charging configuration where a integral connector is made accessible to enable charging by means of the internal circuitry when the integral connector is connected to a suitable powered receptacle on a computing or peripheral device.

BACKGROUND OF THE INVENTION

A significant problem with rechargeable batteries is their general dependency on an external recharging unit, plug and AC socket. This limits the overall "portability" of rechargeable batteries as there is a need to find and carry a charger and connect it to an AC mains supply (which is also less suitable for children due to safety concerns related to high voltages). A further problem is the proliferation of chargers for different battery chemistries creating potential confusion as well as safety concerns, as charging cells in the wrong charger or in an old charger can create problems. Consumers are also inconvenienced by carrying dedicated chargers and cables for each of their appliances. The present arrangements encourage a proliferation of chargers, as well as a disposable battery culture where in excess of 15 billion batteries are thrown away annually, creating a significant environmental and waste problem.

There are now very many USB or other powered ports in existence across a range of computing devices in homes and offices, and on mobile devices, such as laptops, which can act as low voltage power supplies. The mechanisms for USB charging have been well documented and are part of the USB specification. There is an opportunity, as disclosed in our earlier patent applications GB0425967, U.S. Ser. No. 11/211,934, PCT/GB2005/004356, the entire contents of which are hereby incorporated by reference, to create a new battery category of USB Batteries or USB Cells, having in the deployed configuration the same size, format and function as standard format cells so as to fit common appliances and devices, but including circuitry and connectors that can be deployed in a charge mode to enable the device to be charged when connected to a USB port. This application discloses further mechanisms and circuitry to implement advance forms of rechargeable battery assemblies.

BRIEF SUMMARY

According to an embodiment of the invention, there is provided a rechargeable battery assembly comprising a built-in connector, circuitry to provide charge control, at least one rechargeable battery unit, and circuitry providing a further function, where said battery assembly is mechanically reversible between a deployed configuration having a general form and functions of a conventional battery format and a charge configuration in which the connector is made accessible; where said battery assembly in the deployed configuration is capable of providing a discharge to at least one voltage level and can be charged by means of a suitable external charger device; where said battery assembly in the charge configuration can be charged by means of the integral charge control circuitry when the internal connector is connected to a suitable powered receptacle on a computing or peripheral device.

In preferred embodiments the invention provides rechargeable battery assemblies in conventional formats preferably being cylindrical cell e.g. common sized formats such as AA, AAA, AAAA, C, D or prismatic cells such as a 9V PP3 cell or cells suitable to be removed and to use in more than one type of phone, or camera or media player. The cells preferably support normal external positive and negative terminals to be compatible with devices that accept such standardised formats, and optionally additional terminals or contact pins for providing data, battery ID and temperature information. The rechargeable battery assemblies preferably affix or encase at least one rechargeable battery unit, and preferably can use, with suitable control and charge circuitry, a range of different rechargeable chemistries, including but not limited to NiCd, NiMH, Lithium and Lithium Ion Polymer. In preferred embodiments the rechargeable battery units may be electronically combined within the battery assembly to provide an output voltage different from their source voltage. In other embodiments, circuitry may be used to provide a power conversion to increase or decrease the overall output voltage either in a fixed manner prescribed by the circuitry or in a variable manner determined by a variable provided by an onboard chip. The circuitry may be powered by at least one battery unit within the overall assembly when the battery assembly is in a deployed mode capable of providing a discharge.

In preferred embodiments the invention provides rechargeable battery assemblies where said connector is a USB Type A, mini USB Type B or Firewire connector or other connector suitable for connecting to a socket on a computing or peripheral device, providing at least a power supply, or optionally to an adaptor or charger featuring a USB or Firewire connector or other low-voltage powered connector. The computing or peripheral device possessing a socket may be a desktop, a laptop, a portable tablet computer, a powered hub, a portable phone, a camera, a games console, a printer, a portable power pack or a television. The adaptor may draw power from an external car cigarette lighter socket. In preferred embodiments, the connector may be reduced in size or provided in distinct elements that can be arranged to have a smaller profile for storage but can still function as a connector for the purposes of receiving power from a socket. The connector may be reduced to a thin form comprising a circuit board supporting connection pins with at least one of a surrounding plastic mould or reduced surround metal casing. The connector may also in some preferred embodiments fold, flex or hinge, for example, to assume a reduced profile for storage. The connector is preferably mechanically deployable from said battery assembly when in the charge configuration by means of a folding, sliding, rotating, flexing, springing or other mechanism or by folding, sliding, twisting or rotating the overall battery assembly or a sub-section thereof.

In preferred embodiments, the battery assembly has a cap that is movable, or retained by an elastic means, or is foldable, hingeable or slidable. The cap may include a conductive element or prong for making an electrical contact between a positive or negative terminal and bypassing internal circuitry, so that the internal rechargeable battery unit can provide a discharge to an external device or be charged by an external device without dependency on the internal circuitry or without risking damage to the internal circuitry. In another preferred embodiment the prong may connect the positive terminal to the circuitry to receive a voltage level that has been converted from the internal battery unit by means of a power conversion circuit. The cap may also in some preferred embodiments have a secondary recessed prong enabling the source voltage to still be provided to a suitable external device possessing a suitable prong or pin, such as may be found in a custom charger designed for such a cell or in a device that could draw the normal cell format voltage or the secondary cell voltage if the recessed slot is found.

A variety of circuit mechanisms are possible for achieving a power conversion within said overall battery assembly. In one preferred embodiment, where an internal lithium cell is used within a cylindrical cell format, such as an AA or AAA cell, a source voltage of 3.6V-4.2V provided by the internal battery unit uses a step-down circuit to provide an external voltage of either 1.2V or 1.5V, thereby providing a rechargeable battery assembly according to an embodiment of the invention that uses a lithium chemistry but can function as a conventional AA or AAA cell. This arrangement has the advantage of a higher energy density as well as a significant reduction in self-discharge (which is an issue in NiMH chemistries which tend to lose charge at up to 1% a day even when no load is applied across the terminals). The step-down circuitry may be implemented in a number of ways, such as for example a hysteric buck converter with a pulse skipping mode or MOSFET buck converter. Similarly the step-down circuitry may include a MOSFET buck-boost convertor. A variety of mechanisms are proposed for supporting and joining the circuit boards within the battery assembly to support advanced circuitry. Similarly key circuitry could be included on a dedicated integrated chip performing charge control and/or power conversion.

A variety of circuit mechanisms are possible for controlling charging which may at the simplest include a resistor providing a constant charge to the cell, or involve a controller chip that runs an algorithm to measure over time an input parameter that may be a cell voltage or a cell temperature. The algorithm could manage a charging mode such as linear charging, trickle charging, timed charge, switching charging or high current charging in short bursts. Where switched charging is used, this could use a pulse width modulation method. Where voltage is used as an input parameter, the controller chip could make a change to the charge mode following detection of a drop from a peak voltage and similarly, following a peak or threshold in battery temperature. Similarly the controller could time out charge or change mode after a period of time. The control circuitry may comprise protection circuitry to prevent a full discharge or overcharge or an internal battery unit, or to prevent excessive current draw from an internal battery unit.

The control circuitry could be combined with additional functions provided by a microcontroller that performs USB communication and undertakes a process of enumeration (sending messages to the computing device) to determine a high or low charge rate, e.g. at up to 500 mAh or down to 100 mAh. The microcontroller may also provide communications with the computing device such as battery status data and/or a battery identifier when stored on the circuitry, causing the computing device to run a suitable software application to display the charge or other information to a user and/or to pass information, such as the battery identifier, to a remote resource to enable further information to be downloaded and displayed. In embodiments, the user can monitor the battery charge level and maintain the battery usage level. In some embodiments battery change characters can be downloaded to the cell to configure the use of the battery assembly with a changed external voltage level.

The circuitry in further embodiments may also provide additional functions such as any of data storage, data back-up and exchange with a computing device or with a device via additional data connections or other advanced intelligent battery functions. The further circuitry may provide wireless communication or position or movement sensing. The further circuitry may include a security ID or a cryptic key suitable for triggering or authorizing an application on a computing device. The further circuitry may include battery and device usage monitoring or a recording device for monitoring when the battery is operational. The further circuitry may provide for recharging of the internal battery unit by receiving an inductive charge from a nearby induction device and/or may provide at least one LED or indicator capable of providing charging status.

In embodiments, the cap is made of a bio-degradable plastic and includes a tree or plant seed. The battery assembly causes a computing device to which it is attached to provide a user with a recycling message or to take the user to a web page.

A preferred method of packaging together a plurality of battery assemblies as described above comprises packaging least one battery assembly to be visible in the deployed configuration and packaging at least one battery assembly to be visible in the charging configuration. The packaging may include visualization showing the battery assembly in its charging configuration inserted into an example peripheral or computing device. The packaging may include a lenticular image showing a battery assembly in the deployed configuration and in the charging configuration.

BRIEF DESCRIPTION OF THE DRAWINGS

Embodiments of the invention will now be described by way of example with reference to the accompanying drawings, in which:

FIG. 3 shows a cross section view of an example of a preferred embodiment of the rechargeable battery assembly of FIG. 2, showing prongs within the cap that connect through to the internal circuitry;

FIG. 8A shows a three dimensional exploded view of an example of a preferred embodiment of the rechargeable battery assembly for the cylindrical cell shown in FIG. 7 which more clearly shows the plurality of internal battery units and circuit boards, FIG. 8B shows a cross section through the battery assembly showing the triangular arrangement of internal battery units and FIG. 8C shows a cross section through the battery assembly showing a reduced cell and the storage slot for the connector and a circuit board volume;

FIG. 12A shows a three dimensional view of a preferred embodiment of a rechargeable battery assembly for a prismatic cell in the deployed configuration and in the charging configuration where the connector is deployed via a fold mechanism, FIG. 12B shows a three dimensional view of a preferred embodiment of a rechargeable battery assembly for a prismatic cell in the deployed configuration and in the charging configuration where the connector is deployed via a slide mechanism and FIG. 12C shows an exploded view of the rechargeable battery assembly shown in FIG. 12B.

FIG. 13 shows a three dimensional view of preferred embodiments of a rechargeable battery assembly for alternate prismatic cells in the deployed and charging configurations, FIG. 13A showing a cell where the connector is deployed via a slide mechanism, FIG. 13B showing a cell where the connector is deployed via a fold mechanism, FIG. 13C showing a cell where the connector is deployed via a rotate mechanism, FIG. 13D showing a cell where the connector is deployed via a flexible cable and FIG. 13E showing a cell where the connector is deployed by a rotate mechanism and can optionally be detached and retained via a flexible cable; and, FIG. 14 shows an example display package for showing a preferred embodiment of a rechargeable battery assembly in a deployed and charging configuration together with an example image showing the charging configuration inserted into a computing or peripheral device.

DETAILED DESCRIPTION OF PREFERRED EMBODIMENTS

Figure 1:
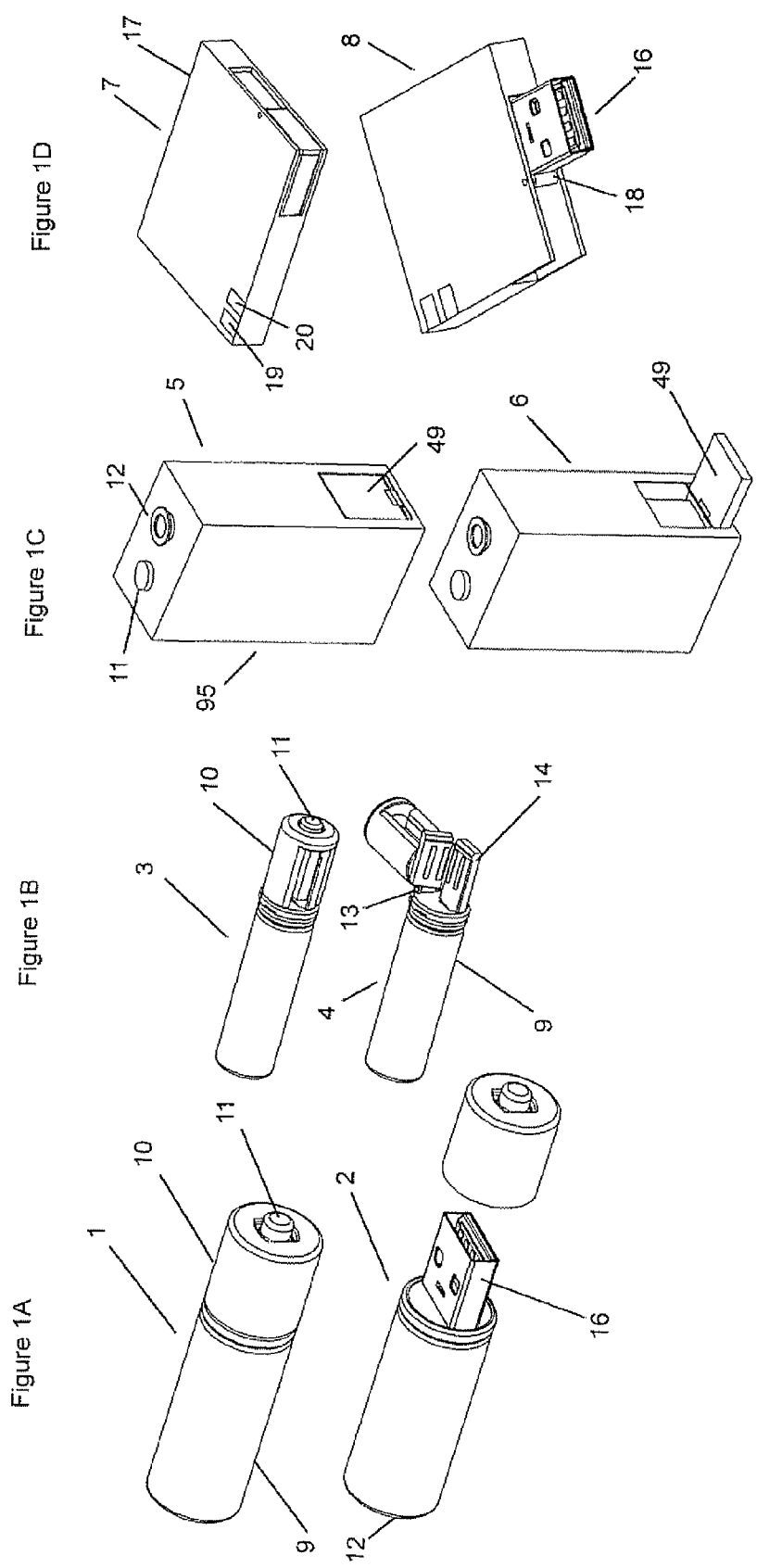
FIGS. 1A, 1B, 1C, 1D show three dimensional views of examples of preferred embodiments of rechargeable battery assemblies according to an embodiment of the invention for various conventional battery formats in a deployed and a charge configuration, FIG. 1A showing an AA format cylindrical cell, FIG. 1B showing an AAA format cylindrical cell, FIG. 1C showing a 9V PP3 format prismatic cell and FIG. 1D showing a prismatic cell such as may be found in a device such as a phone, camera or music player device.

FIGS. 1A, 1B, 1C, 1D show three dimensional views of example preferred embodiments of rechargeable battery assemblies according to an embodiment of the invention for various conventional battery formats in a deployed and a charge configuration. FIG. 1A shows an AA format cylindrical cell in a deployed configuration 1 and in a charging configuration 2 and comprising a rear section 9, a removable cap 10, an internal connector 16, and having an external positive terminal 11 and negative terminal 12. The rear section 9 may be a battery unit itself or enclose a rechargeable battery unit 15.

FIG. 1B shows an AAA format cell in a deployed configuration 3 and in a charging configuration 4, with a rear section 9, movable cap 10 that has a hinge 13 and a folding connector 14, and an external positive terminal 11.

FIG. 1C shows a 9V PP3 prismatic cell in a deployed configuration 5 and in a charging configuration 6 with a casing 95 that encloses rechargeable battery units 15, and a deployable connector 16, and supports external terminals 11 and 12.

FIG. 1D shows a rectangular prismatic cell such as may be found in a device such as a phone, camera or music player device in a deployed configuration 7 and in a charging configuration 8 with a casing 17 that encloses rechargeable battery units 15 and a deployable connector 16 that has a hinge 18, and supports external terminal pins 19 and 20.

Figure 2:
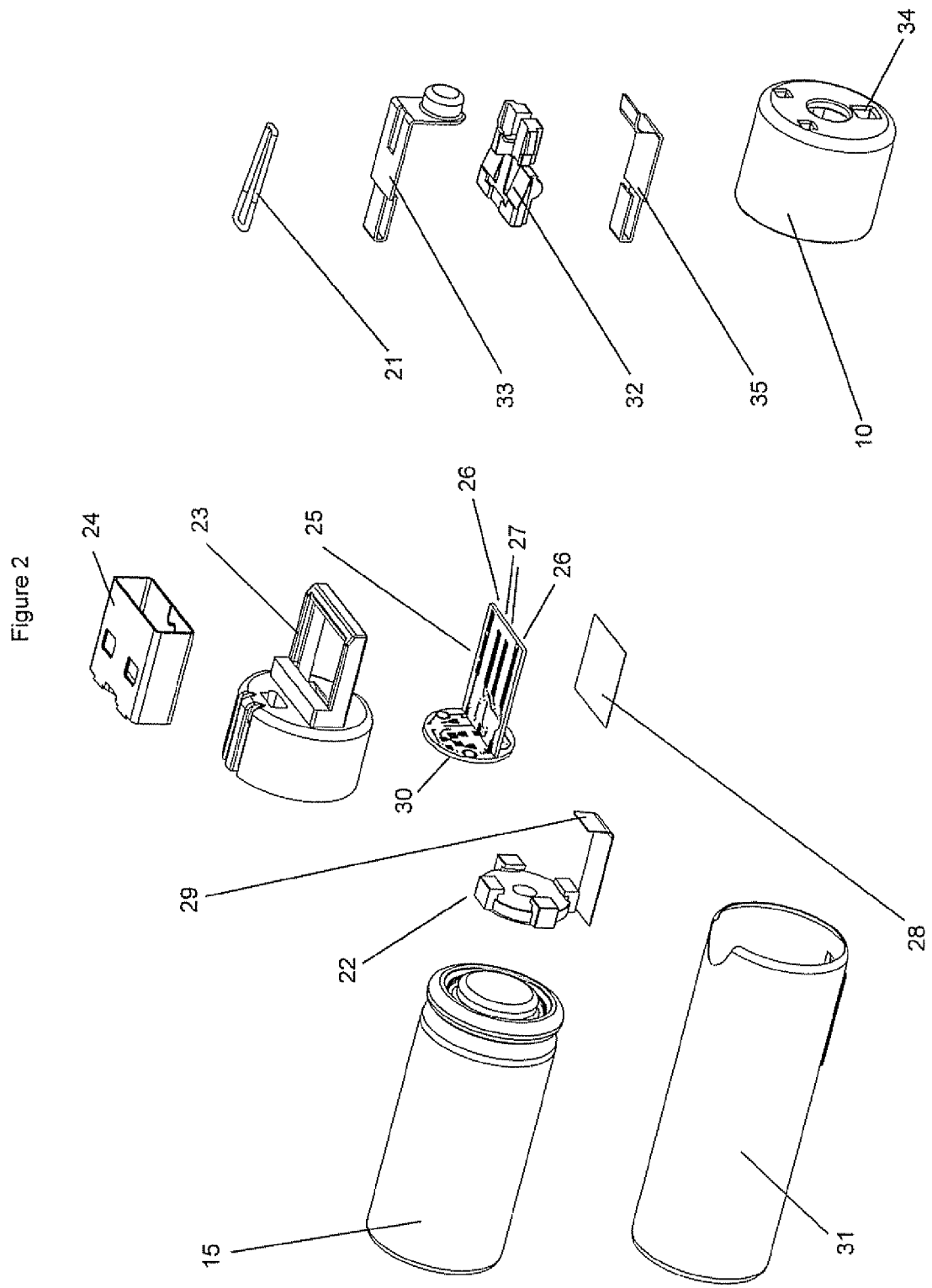
FIG. 2 shows a three dimensional exploded view of an example of a preferred embodiment of a rechargeable battery assembly according to an embodiment of the invention, having a cylindrical format conventional cell with a removable cap retained by an elastic loop, the cell including a shorter internal rechargeable battery unit, circuitry and a USB connector.

FIG. 2 shows a three dimensional exploded view of a rechargeable battery assembly for a cylindrical format conventional cell 1 with a removable cap 10 retained by an elastic loop 21. The cell includes a rear section 9 that is a shorter rechargeable battery unit 15 that supports an insulator 22 and a moulding 23 that forms a USB connector 16 comprised of an outer optional metal shield 24 and internal circuit board 25 supporting power contact pins 26 and data pins 27 and an insulator 28. The circuit board 25 is connected to the battery 15 by means of a negative contact tag 29 and a contact tag or spring 30. The circuit 25 provides a charge control to regulate charging of the rechargeable battery unit 15 when the connector 16 is inserted into a suitable receptacle on a computing or peripheral device and receives a current therefrom. The overall rear section 9, battery unit 15 and moulding 23 are encased in a sleeve 31 which also acts as an insulator over contact tag 29 and the battery cell 15. The cap 10 is capable of sliding over the connector 16 and comprises a plastic support prong 32, which holds a positive prong 33 that provides the external positive terminal 11 and makes electrical contact with a contact area on the internal circuit board 25 when the cap 10 is attached and the battery assembly is in the deployed configuration to provide a first voltage level. The cap 10 also optionally supports a second positive prong 35 which makes electrical contact with an alternative contact area on the circuit board 25 to provide a second voltage level and is accessible by means of a recess 34 that is suitable for a custom prong on an external device.

FIG. 3 shows a cross section view of the rechargeable battery assembly of FIG. 2 and shows more clearly the arrangement of prongs within the cap 10. The positive prong 33 connects the external positive terminal 11 to the circuit board 25. The secondary prong 35 is accessible within a recess 34 and connected to the circuit board 25. The circuit board 25 is connected to the face plate of the battery 15 by means of a contact tag or spring 30 and comprises a circuit board 36 attached to a circular secondary board 37.

Figure 4A:
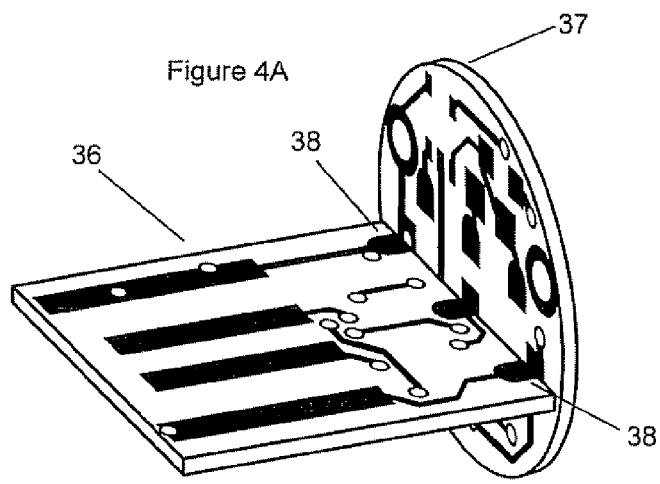
FIG. 4 shows example internal circuit boards supporting contact pins and further circuitry and arranged to be perpendicularly connected together, FIG. 4A showing an example joining mechanism for connecting said boards, FIG. 4B showing a plan view of the upper circuit board wiring and contact pins, FIG. 4C showing an example wiring layout of a circular circuit board and FIG. 4D showing a schematic view of components on the underside of said board that are arranged to lie within the connector.
Figure 4B:
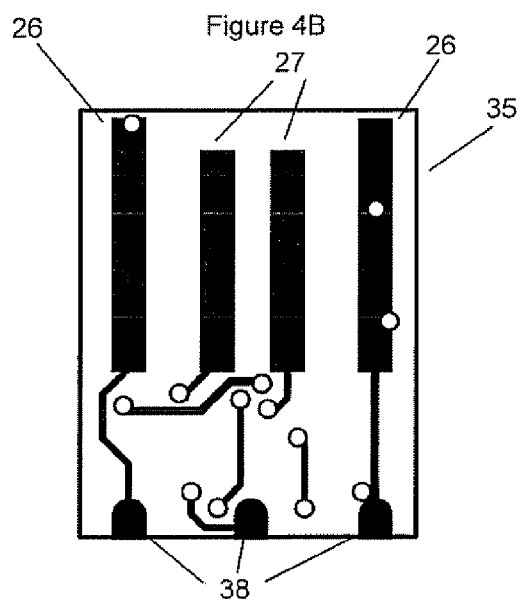
Figure 4C:
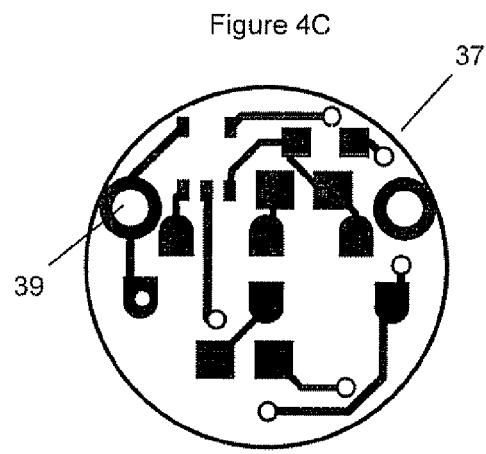
Figure 4D:
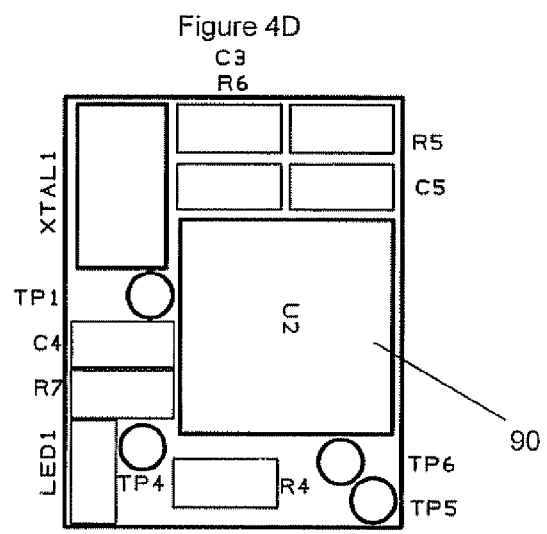

FIG. 4A shows a more detailed view of the arrangement of the circuit board 25 comprising a first board 36 perpendicularly attached to a secondary board 37. FIB 4B shows an example circuit layout for the first board 35, the first board 35 supporting power contact pins 26 and data contact pins 27. Contact points 38 provide an electrical contact between the first board 36 and the secondary board 37 (shown in FIG. 4C). A suitable contact could also be achieved by a flexible cable or connection junction. The secondary board 37 also has holes 39 to support a resistor and arranged to be in proximity to the rechargeable battery cell 15 for the purpose of thermal coupling and using the overall battery cell as a partial heat sink. FIG. 4D shows an example layout of components forming a charge circuit control and may include at least one of a controller chip 40, a microcontroller 90 capable of USB enumeration, an inductor 41, resistors 42, capacitors 43, transistors 44, an LED 45 and heat dissipating resistor 46.

Figure 5:
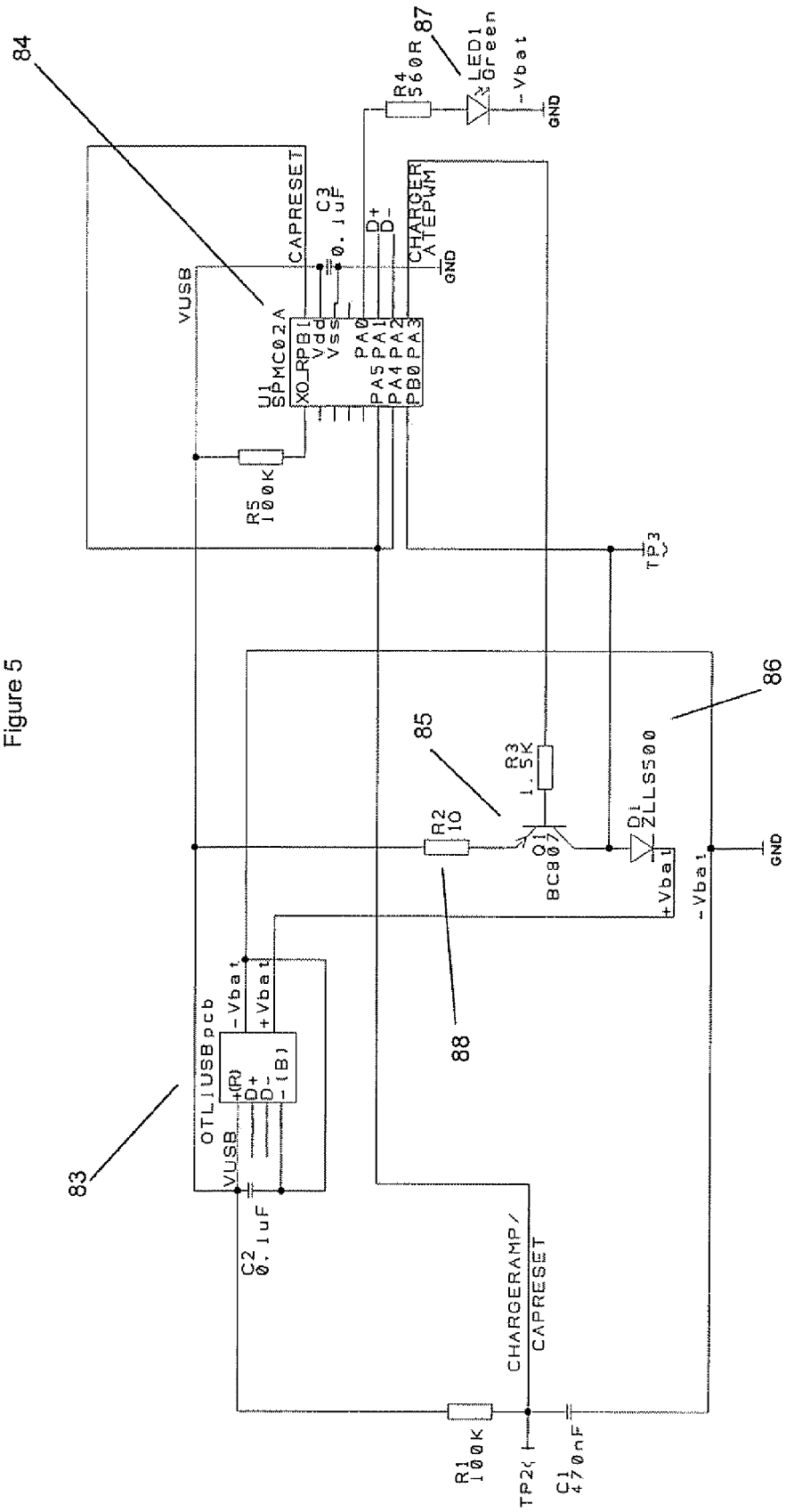
FIG. 5 shows an example circuit board schematic for charge control circuitry with a controller chip for charging a rechargeable battery assembly.

FIG. 5 shows an example circuit board schematic for charge control circuitry, having USB connection prongs 83, a controller chip 84 for controlling a charge algorithm, a transistor 85, a diode 86 for limiting current from the battery passing back into the circuit, an indicator LED 87 and a heat dissipating resistor 88.

Figure 6A:
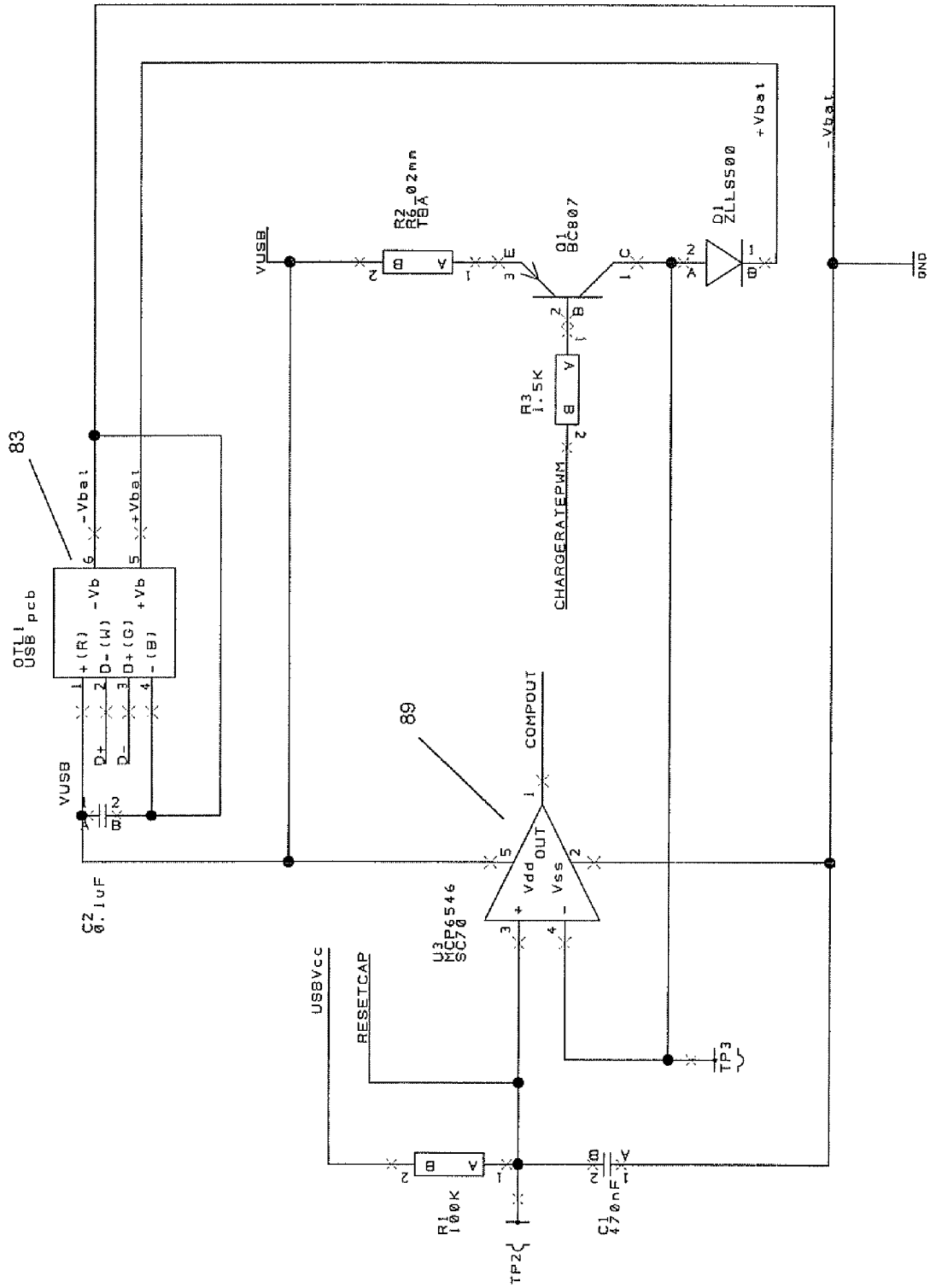
FIG. 6A shows an example circuit board schematic for a charge control circuit with a controller chip that is a microcontroller capable of USB communication and FIG. 6B shows the controller chip of FIG. 6A.
Figure 6B:
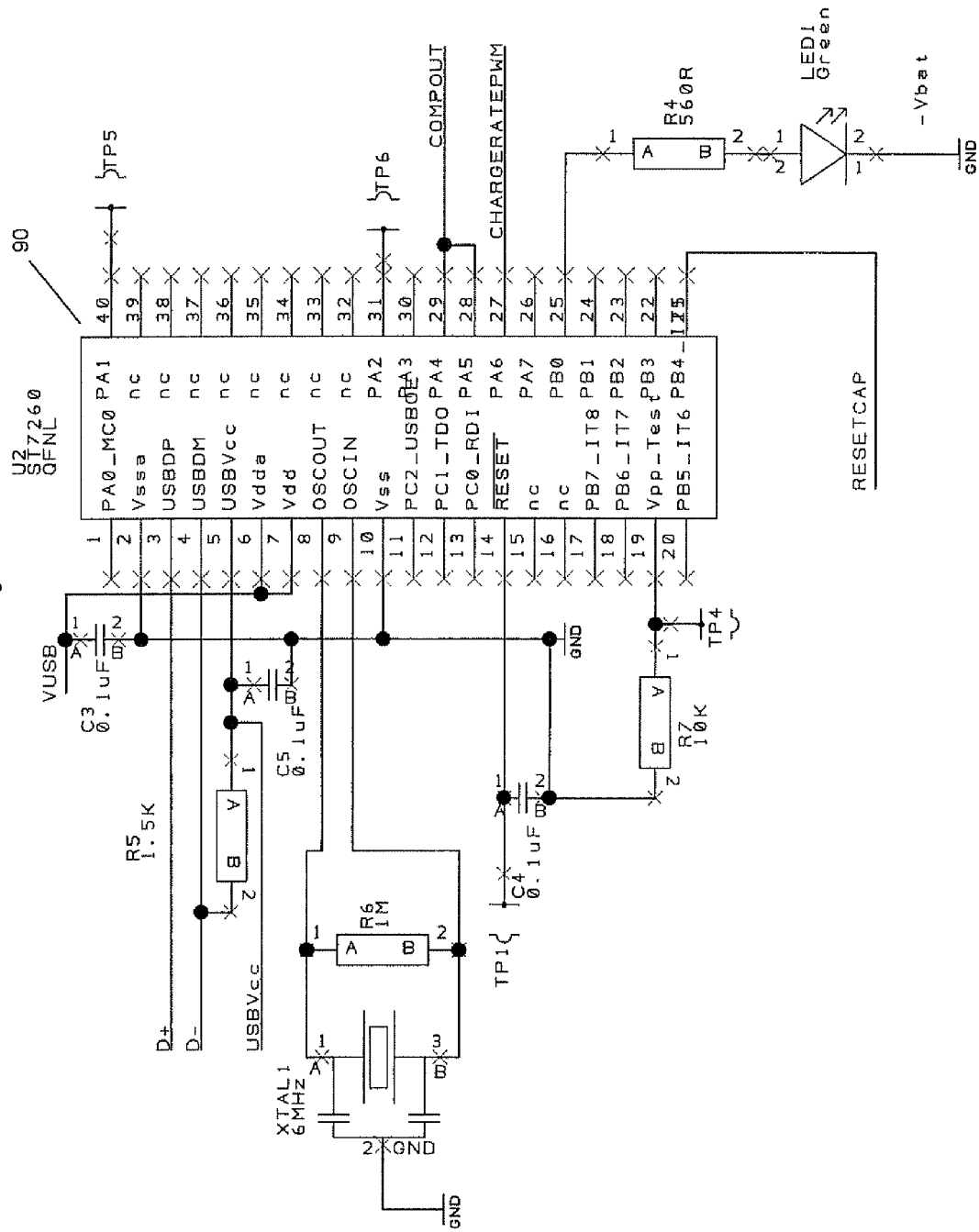

FIG. 6A shows an example circuit board schematic for charge control circuitry having USB connection prongs 83, a comparator or AD converter 89, a transistor 85, a diode 86, a heat dissipating resistor 88. The circuitry is connected to a secondary circuit with a microcontroller 90, as shown in FIG. 6B.

Figure 7A:
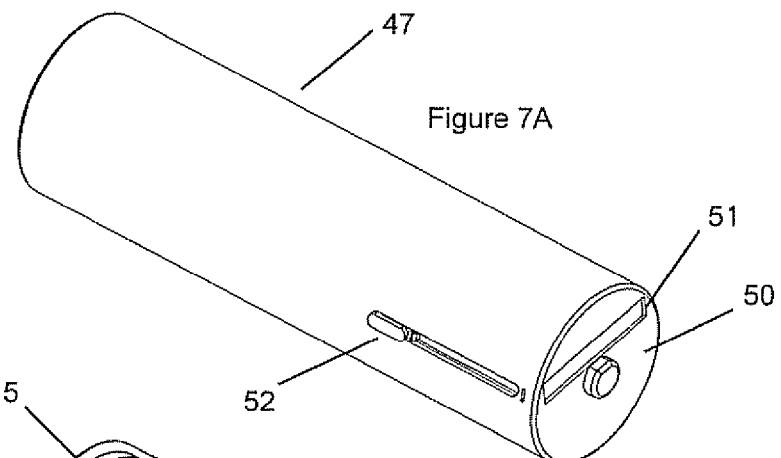
FIG. 7 shows three dimensional views of a preferred embodiment of a rechargeable battery assembly for a cylindrical cell comprising a plurality of internal rechargeable battery units and circuit boards and a slidable connector, FIG. 7A showing the overall assembly in the deployed configuration, FIG. 7B showing a transparent 3D view, FIG. 7C showing the overall assembly in the charging configuration, FIG. 7D showing the reverse of the connector showing contact pins for power and data and FIG. 7E showing an alternative U shaped connector supporting pins for power.
Figure 7B:
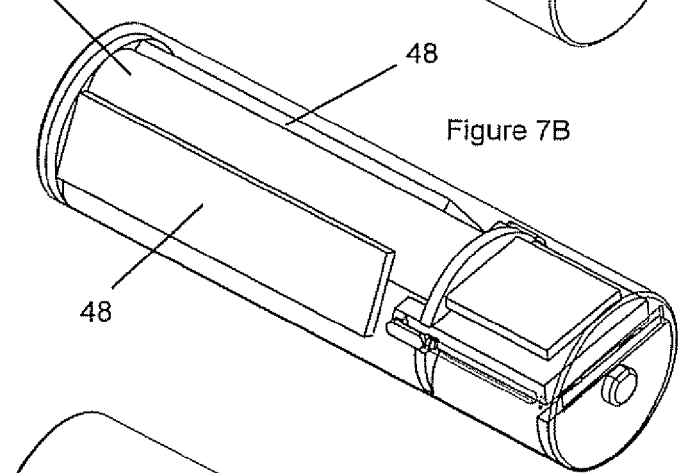
Figure 7C:
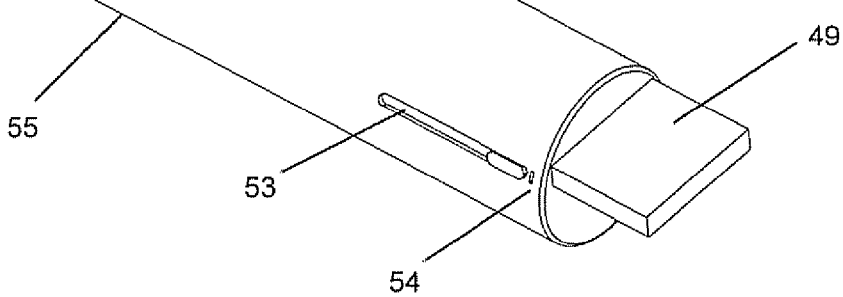
Figures 7D, 7E:
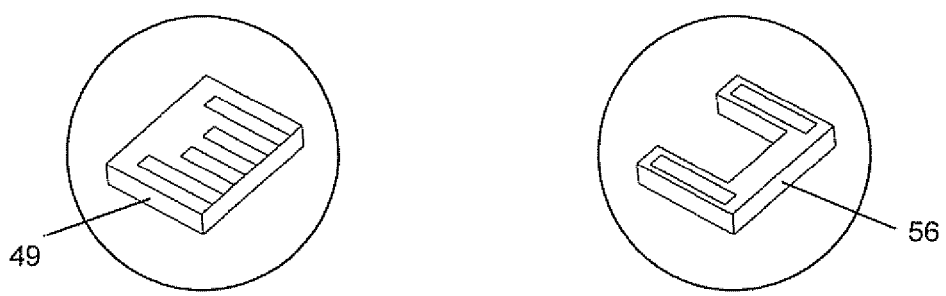

FIG. 7A shows a three dimensional view of a rechargeable battery assembly for a cylindrical cell 47 in the deployed configuration. FIG. 7B shows a transparent 3D view showing the internal structure of the battery assembly and FIG. 7C shows the battery assembly in the charging configuration. The battery assembly comprises a plurality of internal rechargeable battery units 15 and circuit boards 48, and a slidable connector 49 that passes through a slot 51 on a face plate 50 of the overall battery assembly 47, supporting a positive terminal 11. The connector 49 may have sprung side buttons 52 that pass through a groove 53 in the battery assembly casing or shell 55 and are capable of being reversibly locked, e.g. via a catch slot 54. FIG. 7D shows the underside of the slidable connector 49 supporting power pins 26 and data pins 27. FIG. 7E shows an alternative U-shape connector 56 supporting pins for providing power.

FIG. 8A shows a three dimensional exploded view of a preferred embodiment of rechargeable battery assembly for the cylindrical cell shown in FIG. 7, which more clearly shows the plurality of internal battery units 15 and circuit boards 48. The battery assembly comprises an overall battery casing or shell 55, with a rear plate that provides a negative terminal 12 and is insulated from a front plate 50 that supports a positive prong 11 and a groove 51. The battery casing 55 encases the internal battery units, which are arranged in a triangular stacked configuration, with two being close to the overall length of the battery assembly and a reduced cell 57 providing space for the sliding connector 49. The battery units 15 are electrically connected by means of a rear circuit plate 58, which supports contacts 60 for each of the battery units and a contact means 59 for electronically and preferably mechanically connecting to at least one side circuit board 48 arranged to lie in a triangular void between the internal battery units and the external casing. The circuit plate 58 is preferably electronically connected by one of the boards 48 to a central board 61, which supports a further contact 60 for connecting to the reduced cell 57 and which preferably supports a further circuit board 62 arranged to lie perpendicular, which can support larger dimension integrated chips or other components and can be electronically connected to a front circuit plate 63 that provides a contact to the other internal cells 15 and to the positive prong 11. The slidable connector 49 is connected to one of the circuit boards 48, 61, 63 by means of a flexible connector 62. The circuit boards provide surface space for supporting charge control circuitry, cell protection circuitry and other circuitry performing additional functions. FIG. 8B shows a cross-sectional view showing the overall triangular stack configuration of cells 15 within the cell casing 55 and showing the triangular arrangement of circuit boards 48. FIG. 8C shows a cross-sectional view showing the sliding connector 49 arranged to lie in a void provided by the reduced cell 57 and shows a circuit board 62 that can support additional larger dimension integrated chips.

Figure 9A:
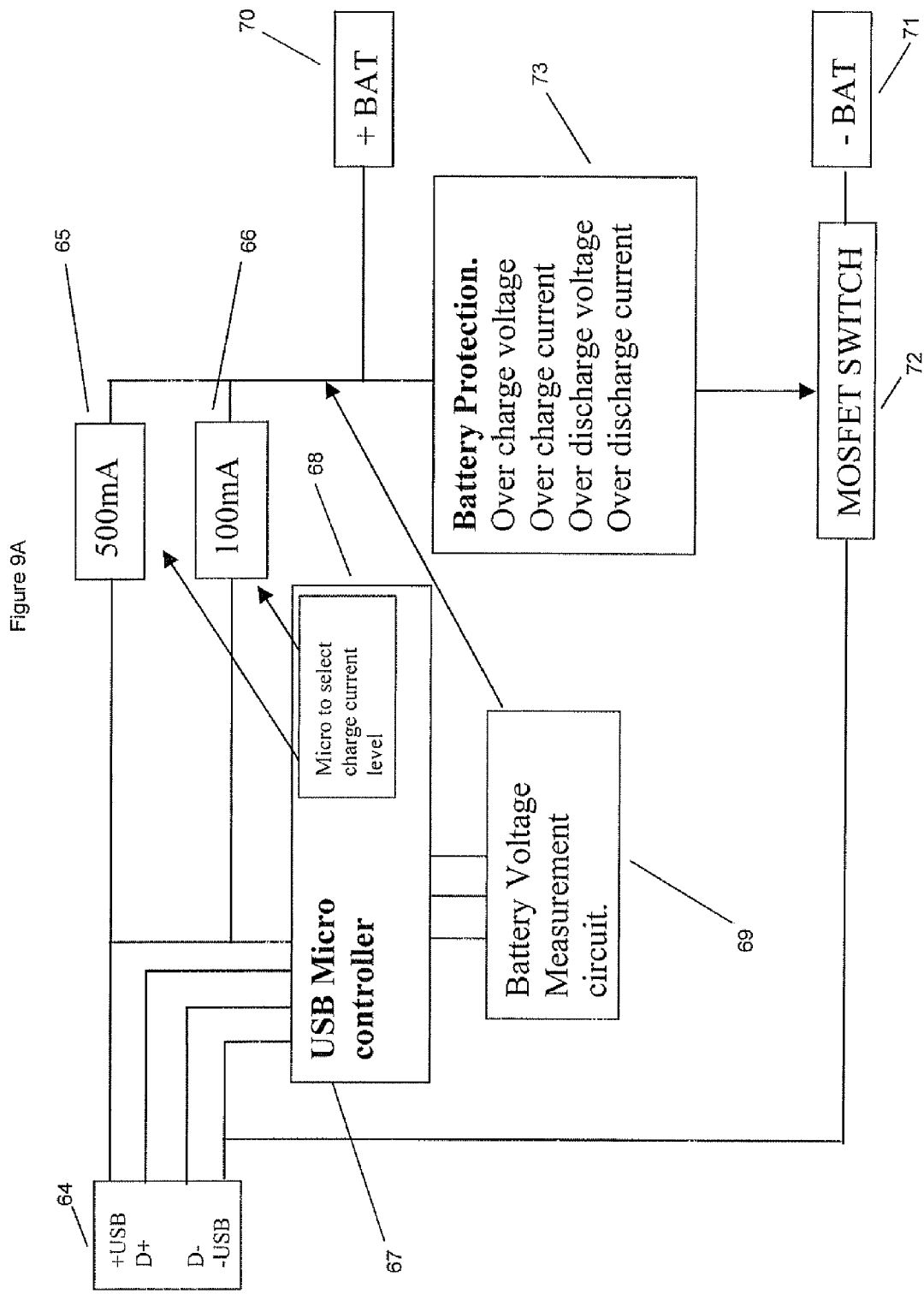
FIG. 9A shows an example circuit block schematic for a charge control circuit with microcontroller for communicating with a USB to determine a high or low charge mode and for charging a lithium based cell according to an embodiment of the invention.
Figure 9B:
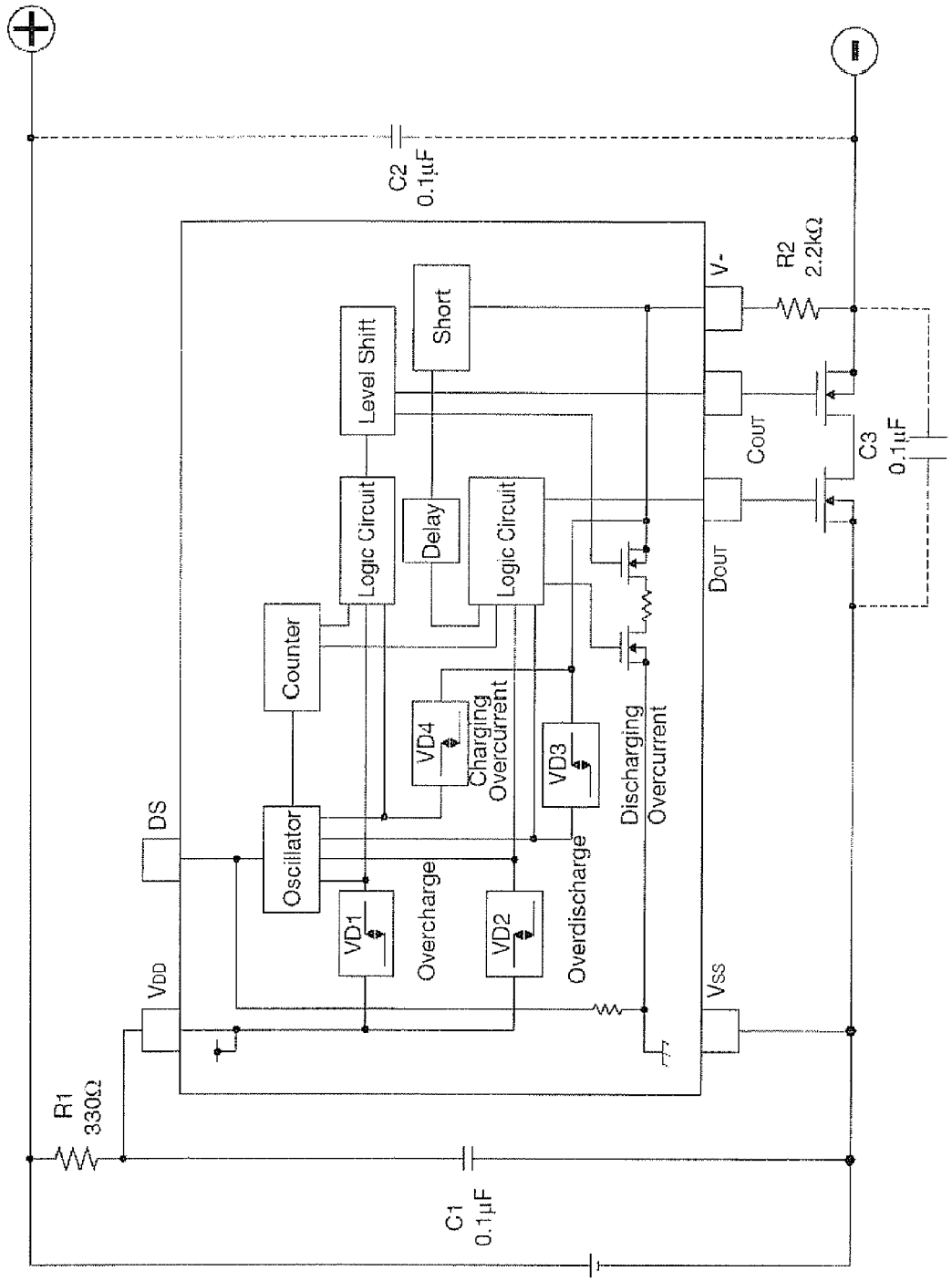
FIG. 9B shows an example protection circuit for protecting the battery during charging or during discharge.

FIG. 9A shows an example circuit block schematic for a charge control circuit with a microcontroller for communicating with a USB port to determine a high or low charge mode and for charging, for example, a lithium-based cell. The circuit includes a USB connection 64 providing power and data connections, a microcontroller 67 capable of undertaking a process of enumeration with a computing device to exchange data and request a high or low charge mode, a sub-circuit 65 triggered if a high charge mode of up to 500 mA is available and a sub-circuit 66 triggered for a low charge mode of 100 mA, together with battery voltage measurement circuitry 69 and a battery protection circuit 73, a MOSFET switch 72, and connection terminals 70 and 71 for the battery unit. FIG. 9B shows an example protection circuit schematic 73 for protecting the battery, capable of preferably detecting one or more of overcharge voltage, any over charge current, any over discharge voltage and any over discharge current.

Figure 10A:
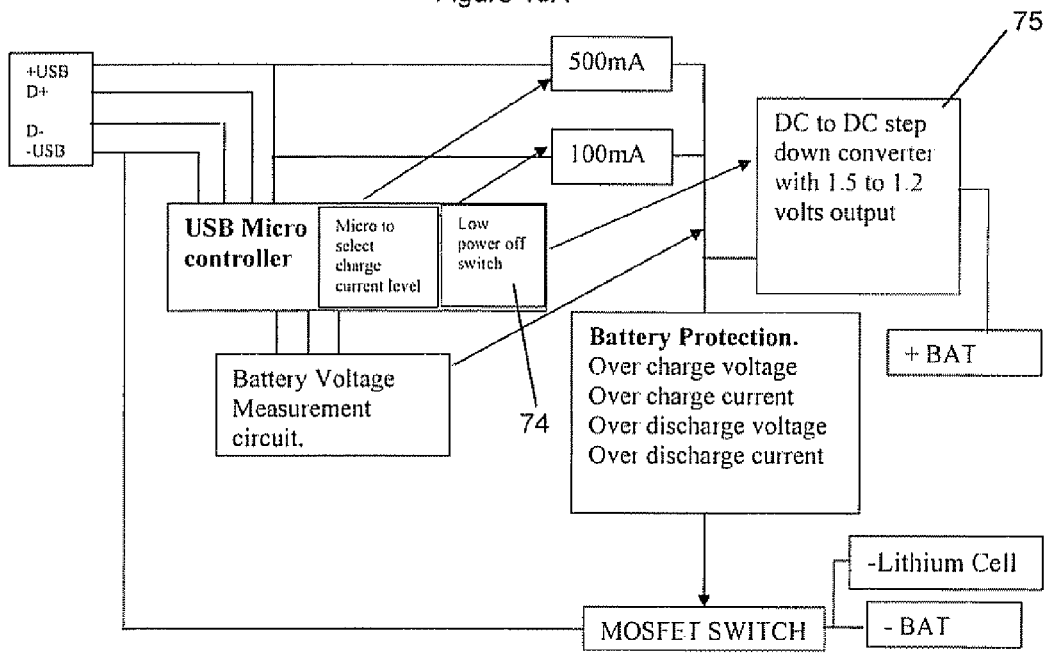
FIG. 10A shows an example circuit block schematic for a charge control circuit as per FIG. 9A but also including a DC-to-DC step down converter circuit and a power saving circuit to minimize or switch off when no load is applied.
Figure 10B:
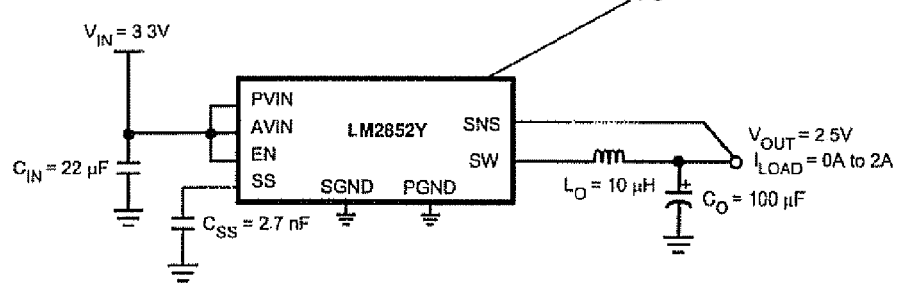
FIG. 10B shows for reference an example step down circuit IC with a low impedance output capable of providing a high current output and FIG. 10C shows for reference an alternative step down circuit IC having a smaller physical package providing a lower current output (600 mA max) more suitable for inclusion in a smaller cell assembly such as an AAA where space is restricted.
Figure 10C:
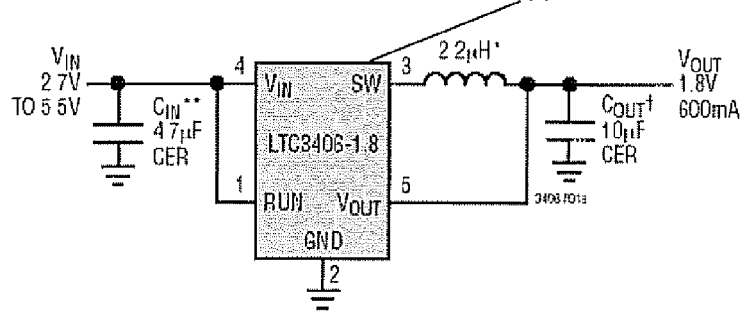

FIG. 10A shows an example circuit block schematic for a charge control circuit as per FIG. 9A but also including a DC-to-DC step down converter circuit 75 and a power saving circuit 74 to reduce or switch off power when no load is applied. FIG. 10B shows an example step down circuit IC 76 with a low impedance output capable of providing a high current output. FIG. 10C shows an alternative step down circuit IC 77, having a smaller physical package and providing a lower current output (600 mA max) more suitable for inclusion in a smaller cell assembly such as an AAA format battery where space is restricted.

Figure 11A:
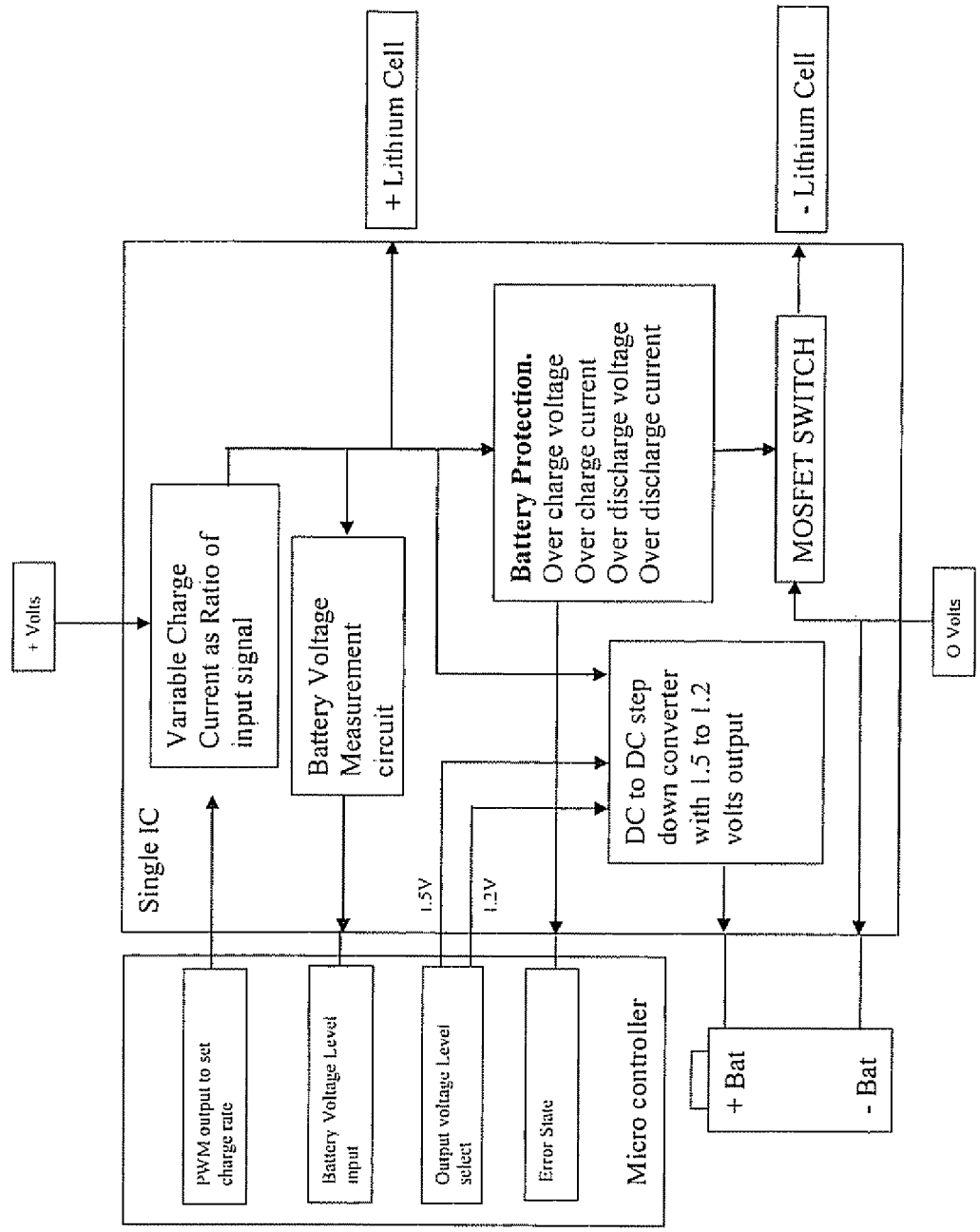
FIGS. 11A and 11B show an example IC block diagrams where functional blocks for charge control, step-down, enumeration and voltage level determination are included within a dedicated IC.
Figure 11B:
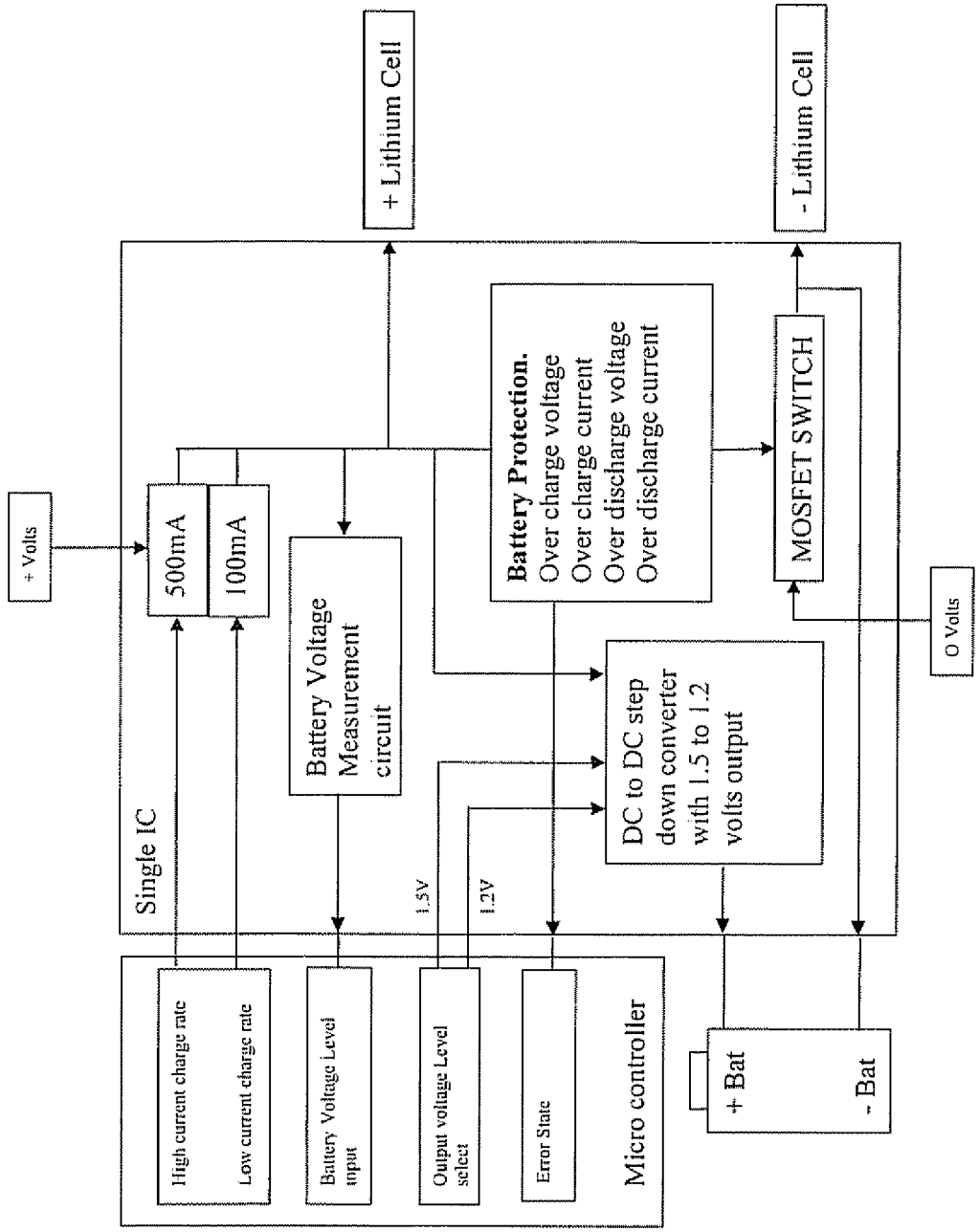

FIGS. 11A and 11B show an example IC block diagram 78 where functional blocks for charge control 79, step-down circuitry 80, enumeration 81 and voltage level determination 82 are included within a dedicated IC. FIG. 11A shows the IC block in combination with a microcontroller which determines the output voltage level and uses a pulse width modulation method to determine charge rate. FIG. 11B shows said IC block in combination with a microcontroller determining a high or low charge rate and the output voltage level.

FIG. 12A shows a three dimensional view of a preferred embodiment of a rechargeable battery assembly for a prismatic cell in the deployed configuration 5 and in the charging configuration 6, where the connector 16 is deployed via a fold mechanism. FIG. 12B shows a three dimensional view of a preferred embodiment of a rechargeable battery assembly for a prismatic cell in the deployed configuration 5 and in the charging configuration 6, where the connector 16 is deployed via a slide mechanism. FIG. 12C shows an exploded view of the rechargeable battery assembly shown in FIG. 12B showing internal cells 15, a casing 95 and external terminals 11 and 12.

FIG. 13 shows three dimensional views of preferred embodiments of a rechargeable battery assembly for alternative prismatic cells in the deployed 7 and charging configurations 8, where a casing 17 encloses a rechargeable a battery unit 15 and a deployable connector 16 and has external terminal pins 19 and 20 for power. FIG. 13A shows a cell where the connector 16 is deployed via a slide mechanism. FIG. 13B shows a cell where the connector 16 is deployed via a fold mechanism. FIG. 13C shows a cell where the connector 16 is deployed via a rotational mechanism about a hinge 18. FIG. 13D shows a cell where the connector 16 is deployed via a flexible cable. FIG. 13E shows a cell where the connector 16 is deployed by a rotational mechanism, and is optionally capable of being detached and retained via a flexible cable.

Figure 14:
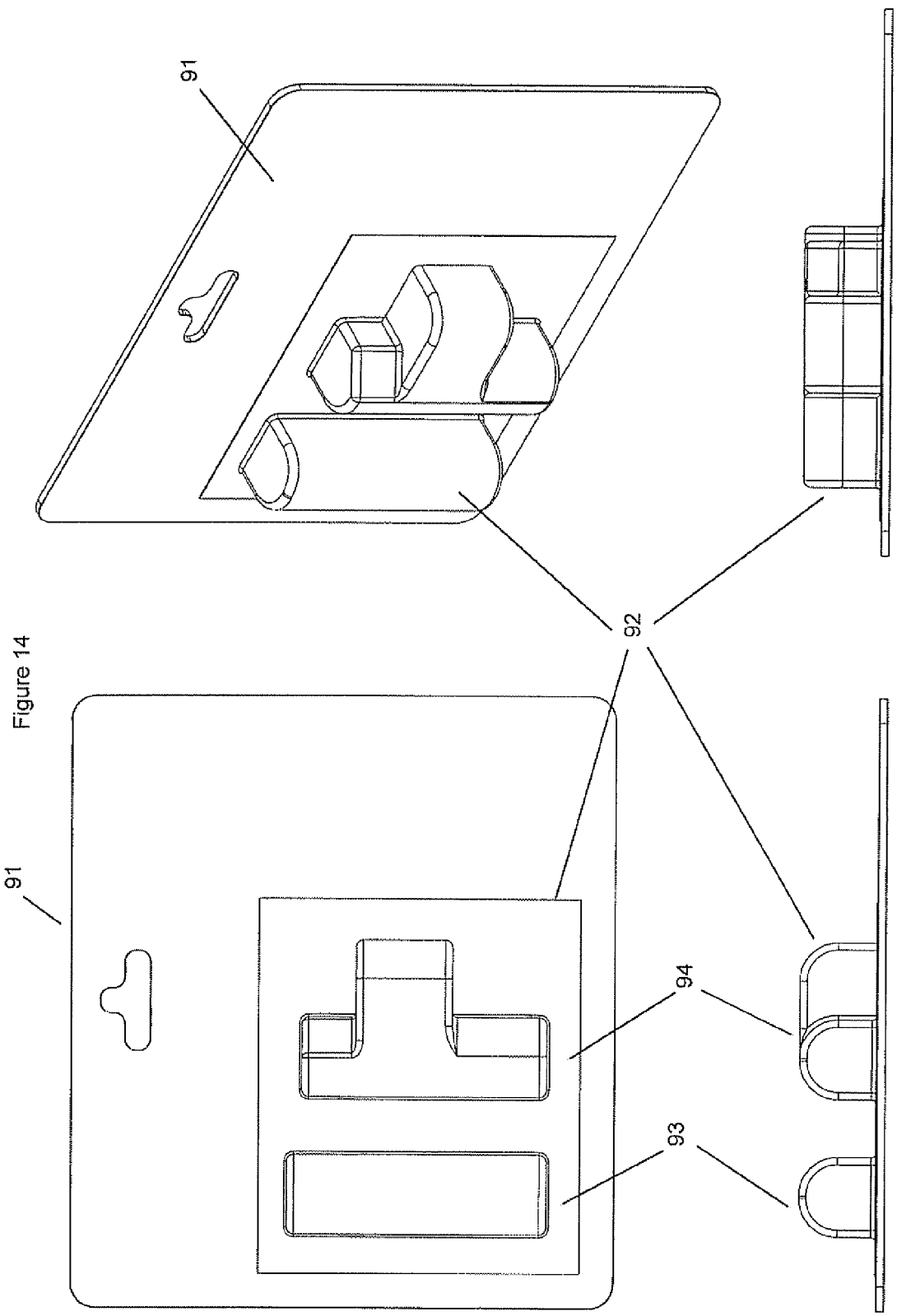

FIG. 14 shows an example display package 91 for showing a preferred embodiment of a rechargeable battery assembly in a deployed and charging configuration, together with preferably an example image showing the charging configuration inserted into a computing or peripheral device. The package includes a plastic mould 92 shaped to wrap over a battery assembly in a deployed configuration 93, and shaped to wrap over a battery assembly in a charging configuration 94.

While preferred embodiments of this invention have been shown and described, modifications thereof can be made by one skilled in the art without departing from the scope of this invention. Accordingly, the scope of protection is not limited to the embodiments described herein, but is only limited by the claims that follow, the scope of which shall include all equivalents of the subject mater of the claims. For example, although the invention is described with reference to some example conventional format cells, and USB connectors, cell chemistries and circuitry, it is expressly understood that it is in now way limited to the disclosure of such preferred embodiments, but is capable of numerous modifications within the scope of the claims.

The invention claimed is:

1. A rechargeable battery assembly, the battery assembly having a prismatic form for being received within a mobile device and comprising:
    positive and negative terminals to supply a voltage to said mobile device;
    a built in data and power connector;
    circuitry to provide charge control; and,
    one or more rechargeable battery units arranged to provide a source voltage;
    wherein said battery assembly is mechanically reversible between a deployed configuration having a general form and functions of a conventional battery format in which said data and power connector, said circuitry and said rechargeable battery units are contained within the overall volume of the prismatic battery form and a charge configuration in which the data and power connector is moved relative to the other parts of the battery assembly so as to be made accessible;
    wherein said battery assembly in the deployed configuration is capable of providing a DC discharge to at least one voltage level via said positive and negative terminals and can be charged by means of a suitable external charger device via said positive and negative terminals; and,
    wherein said battery assembly in the charge configuration can be charged by means of the integral charge control circuitry when the data and power connector is connected to a suitable powered receptacle on a computing or peripheral device;
    wherein the battery assembly has power conversion circuitry including a microcontroller, the circuitry being arranged to achieve DC voltage conversion under the control of the microcontroller during at least one of:
    i) the charge mode of the battery assembly, such that the external DC charge voltage supplied to the connector is different from the DC voltage supplied to the one or more rechargeable battery units during charging; and,
    ii) the discharge mode of the battery assembly, such that the DC discharge voltage is different from the DC source voltage of the one or more rechargeable battery units during discharge.

2. A battery assembly according to claim 1, wherein said battery assembly supports at least one additional prong or pin for at least one of providing data, a battery ID and temperature information.

3. A battery assembly according to claim 1, comprising a plurality of rechargeable battery units having source voltages determined by their respective chemistry, being electrically combined to produce an overall voltage between the positive and negative terminals of the overall battery assembly.

4. A battery assembly according to claim 1, wherein said power conversion circuitry achieves said voltage conversion at least during the discharge mode of the battery and, when in the deployed configuration, the battery assembly has an electrical connection between the positive or negative terminal and said power conversion circuitry.

5. A battery assembly according to claim 4, wherein said power conversion circuitry is powered by at least one of the internal battery units and has a standby or reduced power mode in which minimal power is drawn from the internal battery unit when no load is applied across the terminals of the overall battery assembly.

6. A battery assembly according to claim 4, comprising a second external positive terminal or recessed contact plate or pin that can provide the unconverted discharge voltage as the source voltage or combination of the internal rechargeable battery units.

7. A battery assembly according to claim 6, arranged to be rechargeable by connecting a suitable external charger device possessing a prong or pin suitable for making contact with said second positive terminal or contact plate on the rechargeable battery assembly.

8. A battery assembly according to claim 6, in combination with an external device possessing a prong or pin suitable to place a load across said second terminal or contact plate and the negative terminal on the rechargeable battery assembly.

9. A battery assembly according to claim 4, where said power conversion is achieved by means of a step-down circuit that converts the higher voltage of an internal battery unit to provide the overall battery assembly with a lower voltage output.

10. A battery assembly according to claim 9, where the internal battery unit is of a lithium or other high power density chemistry and has an output voltage which is reduced to provide a lower voltage level between the positive and negative terminals of the overall battery assembly.

11. A battery assembly according to claim 9, where said step-down circuitry is included on an integrated circuit also providing the charge control circuitry.

12. A battery assembly according to claim 1, where said data and power connector having at least a positive and negative terminal and is suitable for connecting to a socket on a computing or peripheral device.

13. A battery assembly according to claim 1, where said data and power connector is capable of being inserted in a Universal Serial Bus such as a USB or Firewire socket to receive a power connection.

14. A battery assembly according to claim 1, where said data and power connector is formed from hinged sub-sections.

15. A battery assembly according to claim 1, where said data and power connector is formed from a semi-flexible material that is reversible between a configuration that forms a curved profile suitable for wrapping around or along a battery profile, and a second configuration that can be flat and suitable for inserting into a socket.

16. A battery assembly according to claim 15, where said data and power connector is a bi-stable material that has a sprung bias to a curved profile suitable for wrapping around or along a battery profile.

17. A battery assembly according to claim 1, where said data and power connector is arranged to mechanically connect to a connector type having at least a positive and negative power connection and at least one data connection and the connector is configurable to support only a positive and a negative power connection.

18. A battery assembly according to claim 17, where said data and power connector is a U shape form.

19. A battery assembly according to claim 1, where said data and power connector is made accessible by a slide mechanism.

20. A battery assembly according to claim 19, where said slide mechanism includes a button passing through the battery assembly casing.

21. A battery assembly according to claim 1, where said charge control circuitry comprises at least a controller chip that runs an algorithm that controls a charge mode to the internal battery unit and measures over time an input parameter that is at least one of cell voltage, cell temperature.

22. A battery assembly according to claim 21, where said algorithm is operable to change the charge mode following detection of a drop from a peak voltage.

23. A battery assembly according to claim 21, where said algorithm is operable to change the charge mode following a peak in temperature or after a temperature threshold.

24. A battery assembly according to claim 21, where said algorithm includes a timer that is operable to measure the elapsed time and change charge mode after a period of time and terminate charging after a further period of time.

25. A battery assembly according to claim 1, where a resistor or other heat dissipating part of the circuitry uses the rechargeable battery unit as a heat sink through being thermal coupled to the battery unit.

26. A battery assembly according to claim 25, where said thermal coupling in use causes a temperature increase in the cell and an increase in the chemical reactions under the Arrhenius effect, reducing the time required to charge the battery.

27. A battery assembly according to claim 1, where said microcontroller can perform data communication via the data and power connector when it is connected to a receptacle on an external computing or peripheral device and where said integral connector includes a connector for transmitting and receiving data.

28. A battery assembly according to claim 27, where said microcontroller is operable to perform USB communication and provide enumeration functions with the external device to enable high current charging mode at up to 500 mAh or low current charging at 100 mAh.

29. A battery assembly according to claim 27, where said microcontroller is operable to provide an input value to charger circuitry or charger IC to enable the charge current to be selected.

30. A battery assembly according to claim 27, where said microcontroller includes or is in communication with a memory storing a battery identifier.

31. A battery assembly according to claim 30, where the microcontroller is arranged to communicate said battery identifier to a computing or peripheral device when the battery assembly is connected thereto.

32. A battery assembly according to claim 31, where said computing device is arranged to pass said battery identifier to a remote resource.

33. A battery assembly according to claim 32, where said computing device is arranged to receive a response from the remote resource that is determined by the battery identifier.

34. A battery assembly according to claim 33, wherein the microcontroller is arranged to pass a battery identifier to a remote resource to enable a replacement purchase once the battery recharge efficiency has dropped below a threshold.

35. A battery assembly according to claim 1, where internal circuitry is included on at least one primary board and at least one secondary circuit board, said secondary board being electronically connected to the primary board and arranged to be perpendicular to the primary board.

36. A battery assembly according to claim 35, where said circuit boards are connected by a flexible cable.

37. A battery assembly according to claim 35, where said secondary board lies within a circular profile.

38. A battery assembly according to claim 1, wherein the mobile device is at least one of: a mobile telephone, a camera and media player.

39. A battery assembly according to claim 1, wherein the data and power connector plug slides relative to the rest of the battery to be made accessible.

40. A battery assembly according to claim 1, wherein the data and power connector plug pivots relative to the rest of the battery to be made accessible.

41. A battery assembly according to claim 1, wherein the data and power connector plug reversibly detaches from the rest of the battery to be made accessible, wherein the data and power connector plug is electrically connected to the rest of the battery via a flexible cable.

\* \* \* \* \*